US008766996B2

(12) United States Patent
Du et al.

(10) Patent No.: US 8,766,996 B2
(45) Date of Patent: Jul. 1, 2014

(54) UNIFIED VIRTUAL ADDRESSED REGISTER FILE

(75) Inventors: Yun Du, San Diego, CA (US); Guofang Jiao, San Diego, CA (US); Chun Yu, San Diego, CA (US); De Dzwo Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 11/472,701

(22) Filed: Jun. 21, 2006

(65) Prior Publication Data

US 2007/0296729 A1 Dec. 27, 2007

(51) Int. Cl.
*G09G 5/36* (2006.01)

(52) U.S. Cl.
USPC ............................ 345/559; 345/530; 345/536

(58) Field of Classification Search
USPC ................................. 345/501–506, 530–574
See application file for complete search history.

(56) References Cited

U.S. PATENT DOCUMENTS

| 3,469,244 | A | | 9/1969 | Perotto |
| 4,079,452 | A | | 3/1978 | Larson et al. |
| 4,361,868 | A | | 11/1982 | Kaplinsky |
| 5,517,611 | A | | 5/1996 | Deering |
| 5,590,326 | A | * | 12/1996 | Manabe ........................ 711/150 |
| 5,598,546 | A | | 1/1997 | Blomgren |
| 5,777,629 | A | * | 7/1998 | Baldwin ........................ 345/506 |
| 5,793,385 | A | * | 8/1998 | Nale ............................. 345/542 |
| 5,794,016 | A | | 8/1998 | Kelleher |
| 5,798,770 | A | | 8/1998 | Baldwin |
| 5,831,640 | A | * | 11/1998 | Wang et al. ................... 345/552 |
| 5,870,579 | A | | 2/1999 | Tan |
| 5,872,729 | A | | 2/1999 | Deolaliker |
| 5,913,059 | A | | 6/1999 | Torii |

(Continued)

FOREIGN PATENT DOCUMENTS

| EP | 0627682 A1 | 12/1994 |
| EP | 0676691 | 10/1995 |

(Continued)

OTHER PUBLICATIONS

Waldspurger et al., Register Relocation: Flexible Contexts for Multithreading, International Symposium on Computer Architcture, Proceedings of the 20th Annual International Symposium on Computer Architecture, 1993.*

(Continued)

*Primary Examiner* — Xiao Wu
*Assistant Examiner* — Charles Tseng
(74) *Attorney, Agent, or Firm* — James R. Gambale, Jr.

(57) ABSTRACT

A multi-threaded processor is provided, such as a shader processor, having an internal unified memory space that is shared by a plurality of threads and is dynamically assigned to threads as needed. A mapping table that maps virtual registers to available internal addresses in the unified memory space so that thread registers can be stored in contiguous or non-contiguous memory addresses. Dynamic sizing of the virtual registers allows flexible allocation of the unified memory space depending on the type and size of data in a thread register. Yet another feature provides an efficient method for storing graphics data in the unified memory space to improve fetch and store operations from the memory space. In particular, pixel data for four pixels in a thread are stored across four memory devices having independent input/output ports that permit the four pixels to be read in a single clock cycle for processing.

27 Claims, 9 Drawing Sheets

(56) References Cited

U.S. PATENT DOCUMENTS

| | | |
|---|---|---|
| 5,913,925 A | 6/1999 | Kahle et al. |
| 5,949,920 A | 9/1999 | Jordan et al. |
| 5,958,041 A | 9/1999 | Petolino, Jr. et al. |
| 5,991,865 A | 11/1999 | Longhenry et al. |
| 6,092,175 A * | 7/2000 | Levy et al. ............... 712/23 |
| 6,188,411 B1 * | 2/2001 | Lai ............... 345/559 |
| 6,219,769 B1 | 4/2001 | Strongin et al. |
| 6,226,604 B1 | 5/2001 | Ehara et al. |
| 6,279,099 B1 | 8/2001 | Van Hook et al. |
| 6,466,221 B1 * | 10/2002 | Satoh et al. ............... 345/556 |
| 6,480,941 B1 | 11/2002 | Franke et al. |
| RE37,944 E * | 12/2002 | Fielder et al. ............... 345/519 |
| 6,493,741 B1 * | 12/2002 | Emer et al. ............... 718/107 |
| 6,515,443 B2 | 2/2003 | Kelly et al. |
| 6,516,443 B1 | 2/2003 | Zook |
| 6,549,209 B1 | 4/2003 | Shinohara et al. |
| 6,570,570 B1 * | 5/2003 | Suzuki et al. ............... 345/505 |
| 6,574,725 B1 | 6/2003 | Kranich et al. |
| 6,577,762 B1 | 6/2003 | Seeger et al. |
| 6,593,932 B2 * | 7/2003 | Porterfield ............... 345/568 |
| 6,614,847 B1 | 9/2003 | Das et al. |
| 6,636,214 B1 | 10/2003 | Leather et al. |
| 6,654,428 B1 | 11/2003 | Bose et al. |
| 6,693,719 B1 | 2/2004 | Gupta et al. |
| 6,697,063 B1 | 2/2004 | Zhu |
| 6,717,583 B2 * | 4/2004 | Shimomura et al. ............... 345/542 |
| 6,734,861 B1 | 5/2004 | Van Dyke et al. |
| 6,744,433 B1 | 6/2004 | Bastos et al. |
| 6,792,575 B1 | 9/2004 | Samaniego et al. |
| 6,807,620 B1 | 10/2004 | Suzuoki et al. |
| 6,825,843 B2 | 11/2004 | Allen et al. |
| 6,891,533 B1 | 5/2005 | Alcorn et al. |
| 6,891,544 B2 | 5/2005 | Oka et al. |
| 6,950,927 B1 | 9/2005 | Apisdorf et al. |
| 6,952,213 B2 * | 10/2005 | Ebihara ............... 345/505 |
| 6,952,440 B1 | 10/2005 | Underbrink |
| 6,958,718 B2 * | 10/2005 | Symes et al. ............... 341/106 |
| 6,964,009 B2 | 11/2005 | Samaniego et al. |
| 6,972,769 B1 * | 12/2005 | Nebeker et al. ............... 345/552 |
| 6,999,076 B2 | 2/2006 | Morein |
| 7,006,881 B1 | 2/2006 | Hoffberg et al. |
| 7,015,913 B1 | 3/2006 | Lindholm et al. |
| 7,015,914 B1 | 3/2006 | Bastos et al. |
| 7,027,062 B2 * | 4/2006 | Lindholm et al. ............... 345/552 |
| 7,027,540 B2 | 4/2006 | Wilson et al. |
| 7,030,878 B2 | 4/2006 | Xu et al. |
| 7,034,828 B1 | 4/2006 | Drebin et al. |
| 7,068,272 B1 | 6/2006 | Voorhies et al. |
| 7,088,371 B2 * | 8/2006 | Lippincott ............... 345/573 |
| 7,098,922 B1 | 8/2006 | Bastos et al. |
| 7,130,443 B1 | 10/2006 | Werner et al. |
| 7,145,565 B2 | 12/2006 | Everitt et al. |
| 7,146,486 B1 | 12/2006 | Prokopenko et al. |
| 7,174,224 B2 | 2/2007 | Hudson et al. |
| 7,196,708 B2 * | 3/2007 | Dorojevets et al. ............... 345/502 |
| 7,239,322 B2 * | 7/2007 | Lefebvre et al. ............... 345/522 |
| 7,239,735 B2 | 7/2007 | Nozaki |
| 7,268,785 B1 * | 9/2007 | Glanville et al. ............... 345/506 |
| 7,339,592 B2 * | 3/2008 | Lindholm et al. ............... 345/543 |
| 7,358,502 B1 | 4/2008 | Appleby et al. |
| 7,372,484 B2 | 5/2008 | Mouli |
| 7,379,067 B2 | 5/2008 | Deering et al. |
| 7,388,588 B2 | 6/2008 | D'Amora et al. |
| 7,447,873 B1 * | 11/2008 | Nordquist ............... 712/22 |
| 7,557,832 B2 | 7/2009 | Lindenstruth et al. |
| 7,574,042 B2 | 8/2009 | Tsuruoka et al. |
| 7,583,294 B2 | 9/2009 | Ray et al. |
| 7,612,803 B2 | 11/2009 | Meitav et al. |
| 7,619,775 B2 | 11/2009 | Kitamura et al. |
| 7,633,506 B1 | 12/2009 | Leather et al. |
| 7,673,281 B2 | 3/2010 | Yamanaka et al. |
| 7,683,962 B2 | 3/2010 | Border et al. |
| 7,684,079 B2 | 3/2010 | Takata et al. |
| 7,733,392 B2 | 6/2010 | Mouli |
| 7,738,699 B2 | 6/2010 | Tsuruoka et al. |
| 7,808,505 B2 | 10/2010 | Deering et al. |
| 7,813,822 B1 | 10/2010 | Hoffberg |
| 7,826,092 B2 | 11/2010 | Ejima et al. |
| 7,904,187 B2 | 3/2011 | Hoffberg et al. |
| 7,920,204 B2 | 4/2011 | Miyanari |
| 7,966,078 B2 | 6/2011 | Hoffberg et al. |
| 7,987,003 B2 | 7/2011 | Hoffberg et al. |
| 8,046,313 B2 | 10/2011 | Hoffberg et al. |
| 8,054,573 B2 | 11/2011 | Mathew et al. |
| 8,154,818 B2 | 4/2012 | Mathew et al. |
| 8,165,916 B2 | 4/2012 | Hoffberg et al. |
| 2002/0091915 A1 | 7/2002 | Parady |
| 2003/0034975 A1 | 2/2003 | Lindholm et al. |
| 2003/0080959 A1 | 5/2003 | Morein |
| 2003/0105793 A1 | 6/2003 | Guttag et al. |
| 2003/0167379 A1 | 9/2003 | Soltis, Jr. |
| 2003/0172234 A1 | 9/2003 | Soltis, Jr. |
| 2004/0030845 A1 | 2/2004 | DeLano et al. |
| 2004/0119710 A1 | 6/2004 | Piazza et al. |
| 2004/0130552 A1 | 7/2004 | Duluk et al. |
| 2004/0172631 A1 | 9/2004 | Howard |
| 2004/0187119 A1 | 9/2004 | Janik et al. |
| 2004/0246260 A1 | 12/2004 | Kim et al. |
| 2005/0090283 A1 | 4/2005 | Rodriquez |
| 2005/0184994 A1 | 8/2005 | Suzuoki et al. |
| 2005/0195198 A1 | 9/2005 | Anderson et al. |
| 2005/0206647 A1 | 9/2005 | Xu et al. |
| 2006/0004942 A1 | 1/2006 | Hetherington et al. |
| 2006/0020831 A1 | 1/2006 | Golla et al. |
| 2006/0028482 A1 | 2/2006 | Donovan et al. |
| 2006/0033735 A1 | 2/2006 | Seiler et al. |
| 2006/0066611 A1 | 3/2006 | Fujiwara et al. |
| 2006/0136919 A1 | 6/2006 | Aingaran et al. |
| 2007/0030280 A1 | 2/2007 | Paltashev et al. |
| 2007/0070075 A1 * | 3/2007 | Hsu ............... 345/559 |
| 2007/0185953 A1 | 8/2007 | Prokopenko et al. |
| 2007/0236495 A1 | 10/2007 | Gruber et al. |
| 2007/0252843 A1 | 11/2007 | Yu et al. |
| 2007/0257905 A1 | 11/2007 | French et al. |
| 2007/0268289 A1 | 11/2007 | Yu et al. |
| 2007/0273698 A1 | 11/2007 | Du et al. |
| 2007/0283356 A1 | 12/2007 | Du et al. |
| 2007/0292047 A1 | 12/2007 | Jiao et al. |
| 2008/0074433 A1 | 3/2008 | Jiao et al. |

FOREIGN PATENT DOCUMENTS

| | | |
|---|---|---|
| EP | 0917056 A2 | 5/1999 |
| JP | 3185521 A | 8/1991 |
| JP | 9062852 A | 3/1997 |
| JP | 9231380 A | 9/1997 |
| JP | 2000057365 A | 2/2000 |
| JP | 2001222712 | 8/2001 |
| JP | 2001236221 A | 8/2001 |
| JP | 2001357410 A | 12/2001 |
| JP | 2002269583 | 9/2002 |
| JP | 2002529870 A | 9/2002 |
| JP | 2006099422 A | 4/2006 |
| RU | 2137186 C1 | 9/1999 |
| RU | 2004109122 | 6/2007 |
| TW | I230869 B | 4/2005 |
| WO | 0028482 A1 | 5/2000 |
| WO | WO0215000 A2 | 2/2002 |
| WO | WO2005086090 A2 | 9/2005 |

OTHER PUBLICATIONS

International Search Report, PCT/US2007/071775—International Searching Authority—European Patent Office—Apr. 21, 2008.
Written Opinion, PCT/US2007/071775—International Searching Authority—European Patent Office—Apr. 21, 2008.
Bjorke K: "High quality filtering" Chapter 24 in Book 'GPU Gems', [Online] 2004, XP002534488 Retrieved from the Internet: URL:http://http.developer.nvidia.com/GPUGems/gpugems_ch24.html> [retrieved on Jun. 29, 2009].
Blamer K et al.: "A Single Chip Multimedia Video Processor," Custom Integrated Circuits Conference, pp. 91-94, Proceedings of the IEEE (May 1994).

(56) References Cited

OTHER PUBLICATIONS

Segal, M. et al.: "The OpenGL Graphics System: A Specification," pp. 1-368, Version 2.0 (Oct. 22, 2004).
Deering M. et al: "The SAGE graphics architecture" Proceedings of the 29th Annual Conference on Computer Graphics and Interactive Techniques (SIGGRAPH'02), Jul. 23-26, 2002, San Antonio, Texas, USA, 2002, pp. 683-692, XP002534489.
Hadwiger M. et al: "Hardware-accelerated high-quality filtering on PC hardware" Proceedings of 2001 Conference on Vision, Modelling and Visualization, Nov. 21-23, 2001, Stuttgart, Germany, [Online] 2001, XP002534490 Retrieved from the Internet: URL:http://wwwvis.informatik.uni-stuttgart.de/vmv01/d1/papers/8.pdf> [retrieved on Jun. 29, 2009].
Hopf MI et al: "Accelerating 3D convolution using graphics hardware"Visualization '99. Proceedings San Francisco, CA, USA Oct. 24-29, 1999, Piscataway, NJ, USA, IEEE, US, Oct. 29, 1999, pp. 471-564, XP031385575 ISBN: 978-0-7803-5897-3.
Novasad J: "Advanced high quality filtering" Chapter 27 in Book 'GPU-Gems 2', [Online] . 2005, XP002534486 Retrieved from the Internet:. URL:http://http.developer.nvidia.com/GPUGems2/gpugems2_chapter27.html> [retrieved on Jun. 29, 2009].
Owens J.D et al: "A survey of general-purpose computation on graphics hardware" Computer Graphics Forum, vol. 26, No. 1, Mar. 2007, pp. 80-113, XP002534491.
Sigg C. et al: "Fast third-order texture filtering" Chapter 20 in Book 'GPU Gems 2', [Online] 2005, XP002534487 Retrieved from the Internet: URL:http://http.developer.nvidia.com/GPUGems2/gpugems2_chapter20.html> [retrieved on Jun. 29, 2009].
Kilgariff et al.; "Chapter 30, The GeForce 6 Series GPU Architecture:" GPU Gems 2 Copyright 2005, pp. 471-491.
Lindholm et al.; "A User-Programmable Vertex Engine;" Aug. 12-17, 2001; ACM SIGGRAPH; pp. 149-158.
Wynn, Chris; "nVIDIA OpenGL Vertex Programming on Future-Generation GPUs;" May 8, 2004; NVIDIA Corporation; pp. 1-97.
Akkary, H. and Driscoll, M. A. 1998. A dynamic multithreading processor. In Proceedings of the 31st Annual ACM/IEEE international Symposium on Microarchitecture (Dallas, Texas, United States). International Symposium on Microarchitecture. IEEE Computer So. 1998, pp. 226-236.
Kenji Watanabe, Wanming Chu, Yamin Li, "Exploiting Java Instruction/Thread Level Parallelism with Horizontal Multithreading," Australasian Computer Systems Architecture Conference, p. 122, 6th Australasian Computer Systems Architecture Conference (AustCSA.) IEEE 2001, pp. 122-129.
Ying Chen, Resit Sendag, David J. Lilja, "Using Incorrect Speculation to Prefetch Data in a Concurrent Multithreaded Processor," Parallel and Distributed Processing Symposium, International, p. 76b, International Parallel and Distributed Processing Sympos., IEEE 2003, pp. 1-9.
Translation of Office Action in Japanese application 2009-511215 corresponding to U.S. Appl. No. 11/435,454, citing WO05086090, US20030080959 and JP2001222712 dated Feb. 22, 2011.
Hiroaki Hirata, and 4 others, "An elementary processor Architecture with Parallel Instruction Issuing from Multiple Threads," Information Processing Society article magazine, Information Processing Society of Japan, 1993, vol. 34, No. 4, pp. 595-605.
Sohn, et al., "A 155-mW 50-Mvertices/s Graphics Processor With Fixed-Point Programmable Vertex Shader for Mobile Application," IEEE Journal of Solid-State Circuits, vol. 41, No. 5, May 2006, pp. 1081-1091.
Onoue, M., et al., "3D Image Handbook", 1st ed., Asakura Publishing Co., Ltd. (Kunizou Asakura), Feb. 20, 2006, pp. 152-170.

* cited by examiner

UNIFIED VIRTUAL ADDRESSED REGISTER FILE

REFERENCE TO CO-PENDING APPLICATIONS FOR PATENT

The present Application for Patent is related to the following co-assigned, co-pending U.S. patent applications:

Ser. No. 11/435,454, entitled "GRAPHICS SYSTEM WITH DYNAMIC REPOSITION OF DEPTH ENGINE," filed on May 16, 2006;

Ser. No. 11/412,678, entitled "GRAPHICS SYSTEM WITH CONFIGURABLE CACHES," filed on Apr. 26, 2006;

Ser. No. 11/445,100, entitled "MULTI-THREADED PROCESSOR WITH DEFERRED THREAD OUTPUT CONTROL," filed on May 31, 2006;

Ser. No. 11/441,696, entitled "GRAPHICS PROCESSOR WITH ARITHMETIC AND ELEMENTARY FUNCTION UNITS," filed on May 25, 2006; and Ser. No. 11/453,436, entitled "CONVOLUTION FILTERING IN A GRAPHICS PROCESSOR," filed on Jun. 14, 2006, which are all expressly incorporated by reference herein.

BACKGROUND

1. Field

Various embodiments of the invention pertain to memory management in processor architectures, and particularly to a multi-threaded processor that may internally reorder output instruction threads.

2. Background

Multi-threaded processors are designed to improve processing performance by efficiently executing multiple data streams (i.e., threads) at once within a single processor. Multiple registers are typically used to maintain the state of multiple threads of execution at one time. Multi-threaded architectures often provide more efficient utilization of various processor resources, and particularly the execution logic or arithmetic logic unit (ALU) within the processor. By feeding multiple threads to the ALU, clock cycles that would otherwise have been idle due to a stall or other delays in the processing of a particular thread may be utilized to service a different thread.

SUMMARY

One application of multi-threaded processors is for graphics processors or circuits, which may be used to render 2-dimensional (2-D) and 3-dimensional (3-D) images for various applications such as video games, graphics, computer-aided design (CAD), simulation and visualization tools, imaging, etc. These images are typically represented by pixels or vectors having various attributes, such as position coordinates, color values, and texture attributes. A graphics processor may employ a shader core to perform certain graphics operations such as shading. Shading is a highly complex graphics operation involving lighting, shadowing, etc. The shader core may be configured to compute transcendental elementary functions that may be approximated with polynomial expressions, which may then be evaluated with relatively simple instructions executed by an ALU.

As part of a multi-threaded processor's operation, thread registers are temporarily stored in an internal memory file for read and/or write operations by the ALU. Such thread registers may include thread input and/or output data, for example. Typically, the internal memory file is divided into a limited number of pre-defined storage spaces. The pre-defined memory spaces are typically the same size and one or more contiguously addressed memory spaces may be assigned or allocated to one or more registers of a particular thread. For instance, memory spaces may be allocated based on a relative addressing scheme where the storage addresses are offsets from a particular beginning address. As content from registers associated with a thread is outputted from the multi-threaded processor, the allocated memory spaces for the thread registers are de-allocated, reused, and/or reallocated to store registers for new threads.

This memory allocation scheme of dividing memory into small size storage spaces is not efficient in terms of area per bit, and is wasteful of the much-needed memory space in a multi-threaded processor core. For instance, if five contiguously addressed memory spaces become available, four of them may be allocated to registers of a new thread. This leaves one unused memory space that may not be used if the subsequent threads need more than one contiguously addressed register. In another example, four contiguously addressed storage spaces for registers may be available but a new thread requires six contiguously addressed storage spaces for registers. The new thread registers cannot be allocated until a large enough area of contiguously addressed memory spaces become available.

Additionally, some thread registers may use only part of an allocated memory space for storage, leaving the remaining memory space unused. That is, when memory spaces are pre-defined, they have a fixed size. In some cases, thread data stored in a register may take-up just a fraction of the storage capacity of the allocated memory space, thereby wasting the unused space.

Thus, a way is needed to more efficiently use and allocate the much needed memory space in an internal register file of multi-threaded processor cores, such as a shader processor.

One feature provides multi-threaded processor having a thread scheduler configured to receive a thread, allocate one or more virtual registers mapped to one or more internal addresses in a unified memory space, and store content of thread registers associated with the thread in the one or more mapped internal addresses in the unified memory space. The thread scheduler determines the size of the received thread registers and dynamically maps the one or more internal addresses in the unified memory space based on the size of the received thread registers. The thread scheduler also de-allocates the one or more virtual registers once the processing unit has processed the thread. The thread scheduler maintains a mapping table of allocated virtual registers mapped to internal addresses in the unified memory space. The mapped internal addresses in the unified memory space may be contiguous or non-contiguous while the one or more virtual registers have contiguous addresses.

A unified register file is coupled to the thread scheduler. The unified register file includes the unified memory space that stores the thread registers. The thread includes pixel data for a plurality of pixels. The unified register file is divided into a plurality of memory banks where the pixel data is stored across two or more of the plurality of memory banks.

A processing unit is coupled to the unified register file and configured to retrieve content of thread registers from the internal addresses in the unified memory space based on the virtual register mapping. The processing unit is configured to (a) process data in the thread to obtain a result, and (b) store the result to one or more other virtual registers mapped to one or more other internal addresses in the unified memory space. The unified register file includes a plurality of simultaneous read and write ports that permit stored content for thread registers to be read from the memory banks while content for new thread registers is stored to the same memory banks. This permits the processing unit to retrieve pixel data for two or more pixels stored across two or more memory banks in a single clock cycle.

A method is also provided for (a) receiving a thread at a multi-threaded processor, the thread including associated thread registers, (b) mapping one or more virtual registers to one or more internal addresses in a unified memory space of the multi-threaded processor, (c) allocating the one or more virtual registers to the received thread, and/or (d) storing content of the thread registers in the one or more internal addresses associated with the allocated virtual registers. The one or more internal addresses may be allocated to correspond to the size of the received thread registers.

DETAILED DESCRIPTION

In the following description, specific details are given to provide a thorough understanding of the embodiments. However, it will be understood by one of ordinary skill in the art that the embodiments may be practiced without these specific details. For example, some circuits may be omitted from block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. Various parts of figures may be combined. A process is terminated when its operations are completed. A process may correspond to a method, a function, a procedure, a subroutine, a subprogram, etc. When a process corresponds to a function, its termination may correspond to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels, and various other mediums capable of storing, containing, or carrying instruction(s) and/or data.

Furthermore, embodiments may be implemented by hardware, software, firmware, middleware, microcode, or a combination thereof. When implemented in software, firmware, middleware, or microcode, the program code or code segments to perform the necessary tasks may be stored in a machine-readable medium such as a storage medium or other storage means. A processor may perform the necessary tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others.

One novel feature provides a multi-threaded processor having an internal unified memory space that is shared by a plurality of threads and is dynamically assigned to thread registers as needed. Instead of having a memory space with pre-defined memory spaces for thread registers, the memory spaces are grouped into a single larger shared memory space for use by multiple threads, the area efficiency and utilization in the processor core is improved.

Another aspect provides a mapping table that maps available space in the unified memory space so that thread registers, including input and/or output registers, can be stored in available memory addresses, either contiguous or non-contiguous. This improves utilization of memory space by using previously unused memory segments and allowing dynamic sizing of the allocated memory spaces for each thread. Dynamic sizing allows a multi-threaded processor to allocate memory space depending on the type and size of data in a thread register. This feature facilitates storing different types of data together in the unified memory space.

Yet another feature provides an efficient method for storing graphics data in the unified memory space to improve fetch and store operations in the memory space. In particular, pixel data for four pixels in a thread are stored across four memory devices having independent input/output ports that permit the four pixels to be read in a single clock cycle by an ALU for processing.

Figure 1:
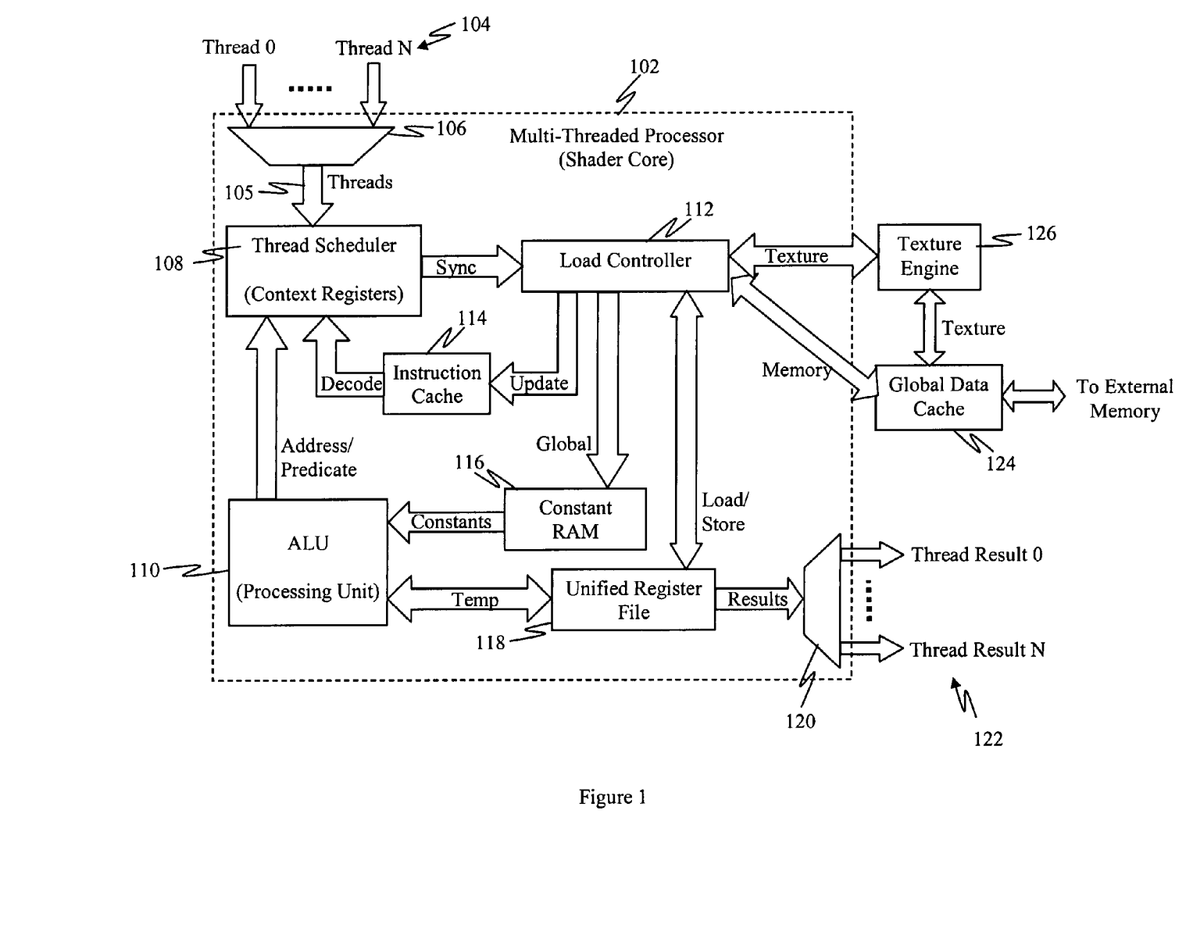
FIG. 1 is a block diagram illustrating a programmable multi-threaded processor, such as a shader core, having a unified memory space that is shared by a plurality of threads and is dynamically allocated to different thread registers.

FIG. 1 is a block diagram illustrating a programmable multi-threaded processor 102, such as a shader core, having a unified memory space that is shared by a plurality of threads and is dynamically allocated to different thread registers according to one embodiment. The terms "core," "engine," "processor," and "processing unit" are used interchangeably herein. A shader core may perform certain graphics operations such as shading and may compute transcendental elementary functions.

A plurality of threads 104 from one or more applications or processes are received at an input interface (e.g., multiplexer 106) that multiplexes the threads 104 into a multiplexed thread 105. Input threads 104 may include graphic data, such as pixels, and indicate a specific task to be performed on one or more pixels. For example, threads 104 may be graphic data having a set of pixel attributes, position coordinates (x, y, z, w), pixel colors (red, green, blue, alpha), and texture attributes (u, v). Each application or process may have more than one thread. In addition to graphics data, input threads 104 may have associated virtual registers, instructions, and attributes, which the multi-threaded processor 102 uses to process the threads 104. Thread scheduler 108 may also include context registers for maintaining process-specific instructions, data, etc.

Thread scheduler 108 receives the thread stream 105 and performs various functions to schedule and manage execution of threads 104. For example, thread scheduler 108 may schedule processing of threads 104, determine whether resources needed by a particular thread are available, and move the thread to a unified register file 118 via a load controller 112. Thread scheduler 108 interfaces with load controller 112 in order to synchronize the resources for received threads 104. Thread scheduler 108 may also monitor the order in which threads 104 are received from a particular application and cause the results for those threads to be outputted in the same order or sequence as they were received.

Thread scheduler 108 selects active threads for execution, checks for read/write port conflicts among the selected threads and, if there are no conflicts, sends instruction(s) for one thread into an ALU 110 and sends instruction(s) for another thread to load controller 112. At the request of thread scheduler 108, load controller 112 may also be configured to obtain data associated with a thread (from texture engine 126) and instructions associated with a thread from an external source (e.g., a global data cache 124 and/or an external memory device, etc.). In addition to issuing fetch requests for missing instructions, load controller 112 loads thread data into unified register file 118 and associated instructions into instruction cache 114. Thread scheduler 108 also removes threads that have been processed by ALU 110.

ALU 110 may be a single quad ALU or four scalar ALUs. In one implementation, ALU 110 may perform pixel-parallel processing on one component of an attribute for up to four pixels. Alternatively, ALU 110 may perform component-parallel processing on up to four components of an attribute for a single pixel. ALU 110 fetches data from register file 118 and receives constants from constant RAM 116. Ideally, ALU 110 processes data at every clock cycle so that it is not idle, thereby increasing processing efficiency. ALU 110 may include multiple read and write ports on an interface to register file 118 so that it is able to write out thread results while new thread data is fetched/read on each clock cycle.

Multi-threaded processor 102 may be a programmable processor configured to efficiently process particular types of data streams. For example, multi-threaded processor 102 may include constant data for efficiently processing multi-media data streams (e.g., video, audio, etc.). For this purpose, constant RAM 116 may be included in multi-threaded processor 102 to enable load controller 112, under the direction of thread scheduler 108, to load application-specific constant data to efficiently process particular types of instructions. For instance, an instruction cache 114 stores instructions for the threads to provide instructions to thread scheduler 108. Under the control of thread scheduler 108, load controller 112 loads instruction cache 114 with instructions from global data cache 124 and loads constant RAM 116 and unified register file 118 with data from global data cache 124 and/or texture engine 126. The instructions indicate specific operations to be performed for each thread. Each operation may be an arithmetic operation, an elementary function, a memory access operation, etc.

Constant RAM 116 stores constant values used by ALU 110. Unified register file 118 may store temporary results as well as final results from ALU 110 for threads. An output interface (e.g., demultiplexer 120) receives the final results for the executed threads from unified register file 118 and provides these results to the corresponding applications.

One feature provides a register map table for each received or processed thread that maps contiguous virtual register addresses into a unified physical memory space in unified register file 118. For instance, thread scheduler 108 may map a unified memory space in unified register file 118 into contiguous virtual register addresses that can be allocated to threads. Rather than utilizing a memory space divided into pre-defined memory segments to store thread registers, unified register file 118 may be treated as a unified memory space that is shared among all threads. By mapping virtual registers into the unified memory space, the memory space is used more efficiently, with less wasted storage space, and allows allocating virtual registers of different sizes as needed by each type of thread.

Figure 2:
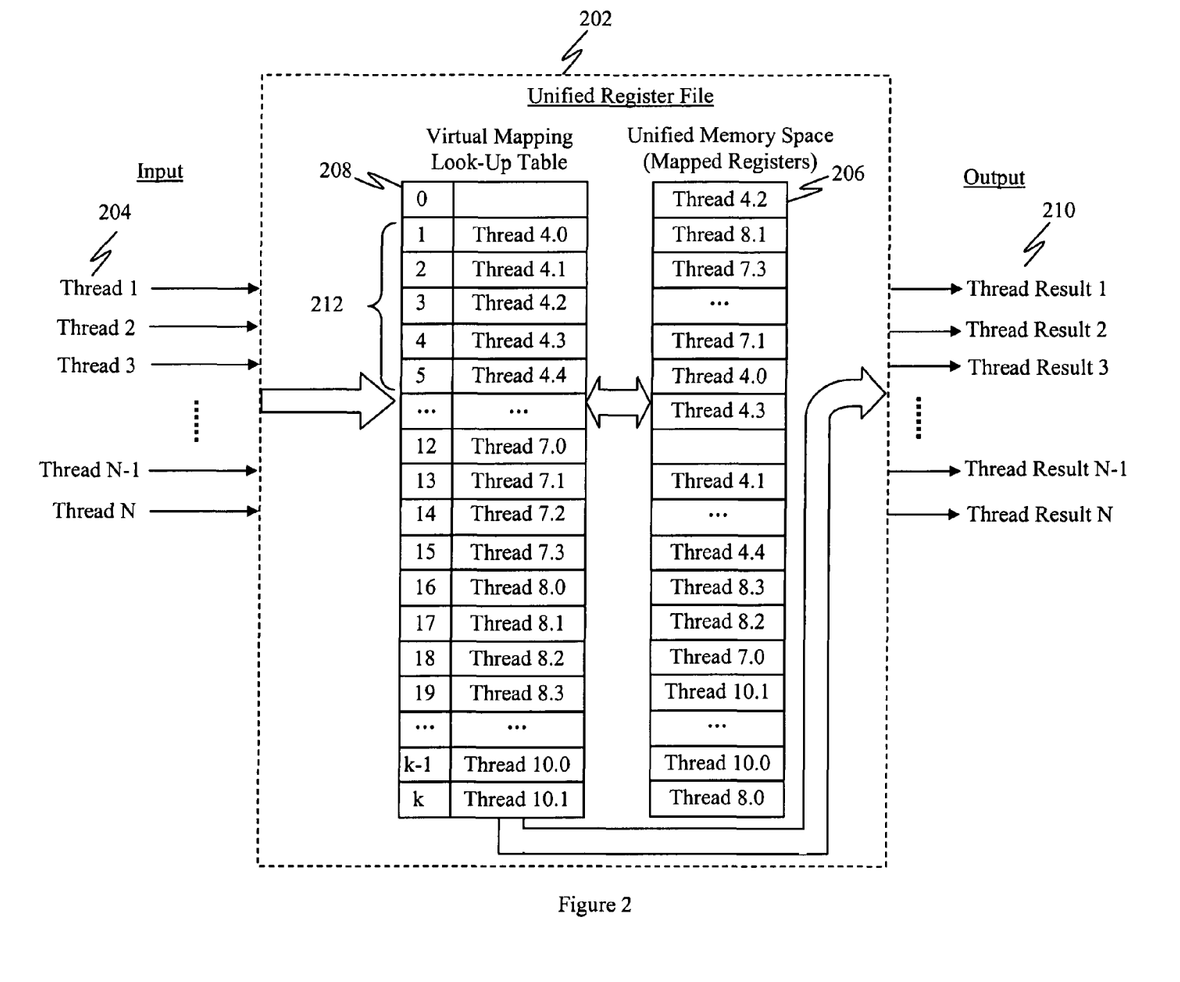
FIG. 2 is a block diagram illustrating how a unified memory space may be mapped by virtual registers.

FIG. 2 is a block diagram illustrating how a unified memory space may be mapped by virtual registers. A unified register file 202 may receive a plurality of threads 204, either sequentially or in parallel, that are stored in a unified memory space 206 according to a virtual mapping look-up table 208. For example, for each thread associated with a particular application or process, virtual mapping look-up table 208 defines virtual registers having contiguous/adjacent addresses. These virtual registers are then mapped to physical addresses in the unified memory space 206. The virtual mapping look-up table 208 may be managed by a thread scheduler and can be internal or external to unified register file 202. As threads are received by a multi-threaded processor, virtual mapping look-up table 208 allocates contiguous virtual registers to the threads. Such contiguous addressing is useful when using relative addressing in which a starting offset or address and an ending offset or address are used to indicate the memory locations in which data for a particular thread is stored. For example, virtual registers 212 are allocated for use by Thread 4. Virtual registers 212 are mapped to addresses in unified memory space 206 that can be either contiguous or non-contiguous. For instance, the various registers of Threads 4, 7, and 8 may be stored in various contiguous or non-contiguous memory areas of unified memory space 206. By using virtual mapping look-up table 208, registers for threads 204 may be stored to, and/or read from, unified memory space 206.

In various implementations, the mapped registers in unified memory space 206 may be of different sizes. Virtual addressing allows multiple registers of different sizes to be efficiently stored in unified memory space 206 in unified register file 202. Once execution of a thread has been completed and its results have been outputted, the memory space allocated to the thread registers may be de-allocated, resized, and/or reassigned to store other registers for other threads. This is done by the thread scheduler keeping track of what memory spaces are available and which memory spaces have been allocated to thread registers.

Figure 3:
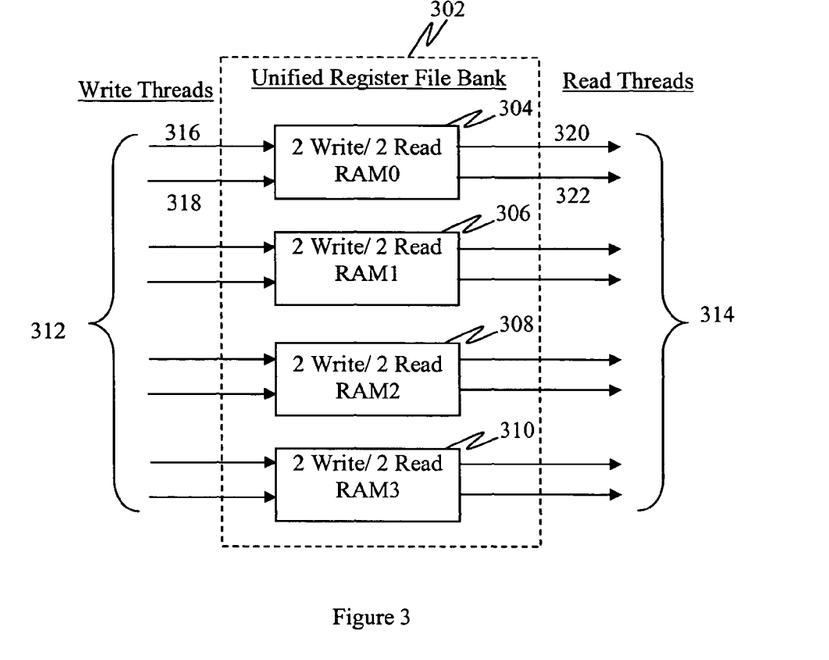
FIG. 3 is a block diagram illustrating a unified register file having four random access memory devices arranged for efficient read and write access according to one embodiment of a multi-threaded processor.

FIG. 3 is a block diagram illustrating a unified register file 302 having four memory banks 304, 306, 308, and 310 arranged for efficient read and write access according to one embodiment of a multi-threaded processor. Unified register file 302 may be used by one or more ALUs and/or a load controller to load and/or fetch thread data. The four memory banks 304, 306, 308, and 310 maybe defined across one or more random access memory (RAM) devices. Content for thread registers can be written into unified register file 302 through write ports 312 and the content can be fetched through read ports 314. In this example, the memory banks 304, 306, 308, and 310 each have two write ports 316 and 318 and two read ports 320 and 322. In other implementations, fewer or greater memory banks and read/write ports may be employed depending on the number of processing cores used by the multi-threaded processor in which unified register file 302 is used.

In one implementation, a thread can be written through eight write ports 312 into the memory banks 304, 306, 308, and 310 and simultaneously, in the same clock cycle, another thread can be read from memory banks 304, 306, 308, and 310 through eight read ports 314.

In another implementation, each memory bank 304, 306, 308 and 310 is logically split into two segments of one write port 316 and one read port 320 each.

Figure 4:
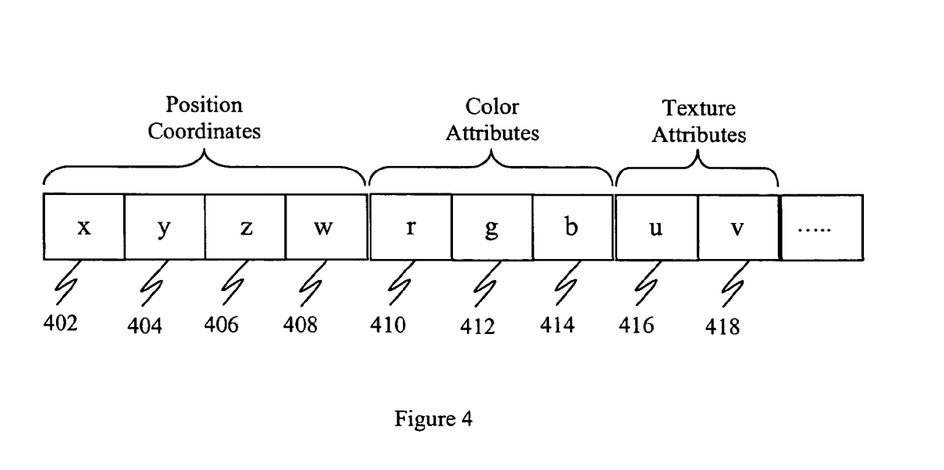
FIG. 4 illustrates how graphic data, such as components of a pixel and its attributes, may be represented.

Another feature provides an efficient method for storing graphic data in virtual registers in the unified memory space to improve fetch and store operations from the memory space. FIG. 4 illustrates how graphic data, such as components of a pixel and its attributes, may be represented. Each pixel may have various attributes such as space coordinates, color values, texture values, etc. Each attribute may have up to four components. For example, homogeneous position coordinates for pixels are typically represented as space coordinates x 402, y 404, and z 406, and a homogeneous value w 408. The color values for a particular pixel are typically given by red (r) 410, green (g) 412, and blue (b) 414. Similarly, texture coordinates for the pixel are typically given by a horizontal texture coordinate (u) 416 and vertical texture coordinate (v) 418. Other attributes may also be associated with a pixel.

In many cases, it is desirable to operate on groups of four pixels in two-by-two (2×2) grids of an image to be rendered. Processing of four pixels in a two-by-two (2×2) grid may be performed in several manners.

Figure 5:
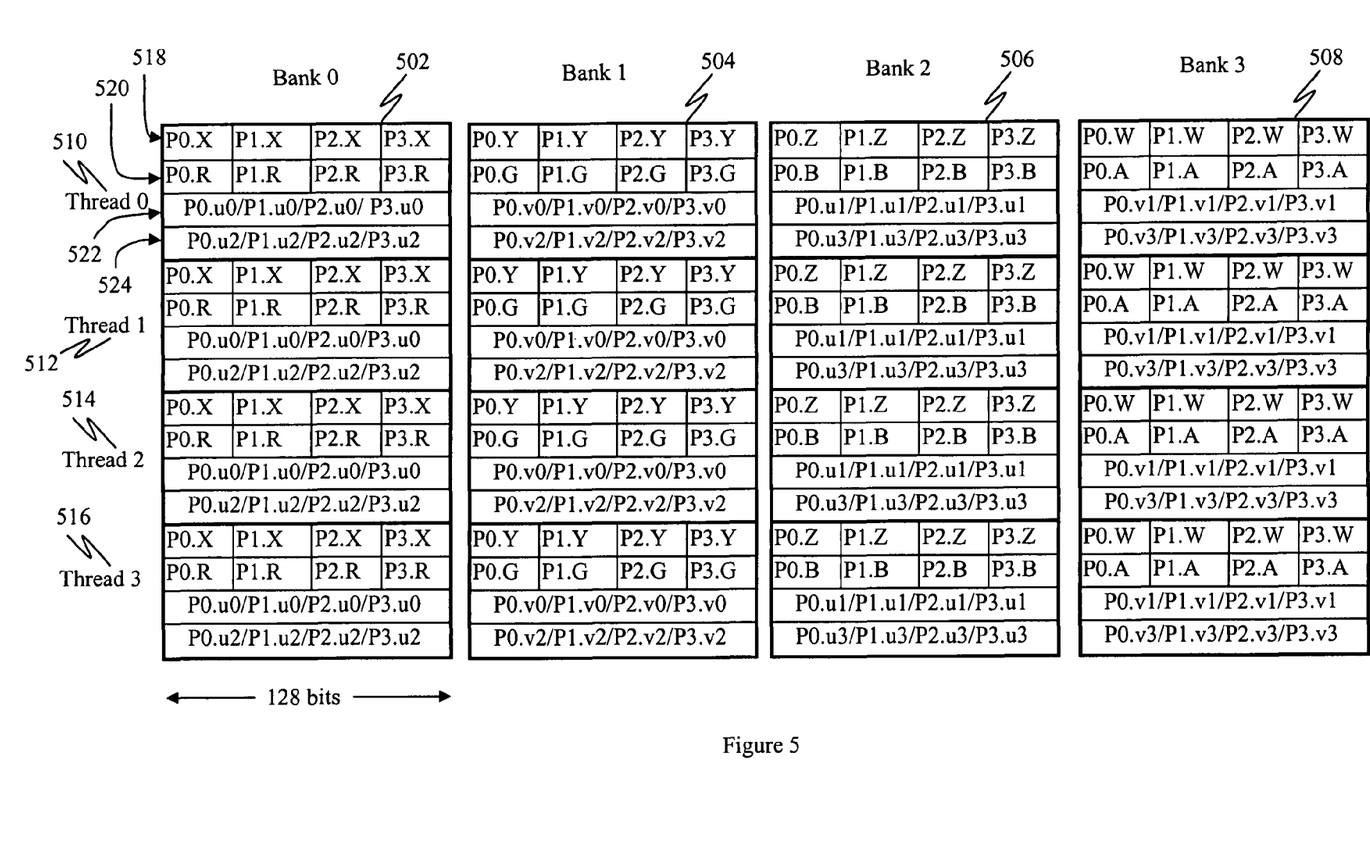
FIG. 5 is a diagram illustrating how graphic (pixel) data may be stored in a memory device so that it may be more efficiently processed by a multi-threaded processor.

FIG. 5 is a diagram illustrating how graphics (pixel) data may be stored in memory banks of one or more memory devices (of a unified register file) so that scalar operations may be more efficiently processed by a multi-threaded processor. The four memory banks 502, 504, 506, and 508 may have two input ports and two output ports each. Such input and output ports allows multiple thread access by a plurality of ALU processors as well as access to operands in the same memory bank during a single clock cycle.

In one implementation, pixel data for different threads 510, 512, 514, and 516 is stored across the four memory banks 502, 504, 506, and 508. Each memory bank includes mapped virtual registers for storing position coordinates 518, color attributes 520, and texture attributes 522 and 524 for pixels in a thread. Each pixel P0, P1, P2 and P3 is represent by x, y, z, w coordinates (i.e., pixel 0=P0.X, P0.Y, P0.Z, P0.W; pixel 1=P1.X, P1.Y, P1.Z, P1.W; pixel 2=P2.X, P2.Y, P2.Z, P2.W; and pixel 3=P3.X, P3.Y, P3.Z, P3.W) stored across the four memory banks 502, 504, 506, and 508. For instance, a first register 518 in Bank 0 502 stores the position x coordinates for the four pixels P0, P1, P2, and P3 in Thread 0 510.

Color attributes (i.e., Red, Green, Blue, Alpha-r, g, b, a) for pixels P0, P1, P2 and P3 are similarly stored (i.e., red=P0.R, P1.R, P2.R, P3.R; green=P0.G, P1.G, P2.G, P3.G; blue=P0.B, P1.B, P2.B, P3.B; and alpha=P0.A, P1.A, P2.A, P3.A) across the four memory banks 502, 504, 506, and 508. For instance, a second register 520 can be used to store the red (R) color value for the four pixels (i.e., P0, P1, P2, and P3).

A third and fourth registers 522 and 524 may be used to store texture attributes, such as (u, v), associated with the particular pixels P0, P1, P2, and P3. For instance, P0.$u$0, P1.$u$0, P2.$u$0, P3.$u$0 in register 522 in Bank 0 represent part of texture attribute u for pixels P0, P1, P2, and P3, respectively.

By storing pixel data in registers across multiple memory banks, scalar operations may be performed more efficiently by an ALU processor. For example, if a scalar operation P0.X+P0.Y is to be performed on coordinates X and Y of pixel P0, the pixel data for P0.X is fetched from Bank 0 502 and, simultaneously, pixel data for P0.Y is fetched from Bank 1 504. By storing pixel data for a pixel across several RAM devices such data can be fetched by an ALU processor in a single clock cycle.

In one implementation, each register 518, 520, 522, and 524 can store one hundred twenty-eight (128) bits. Thus, each position coordinate (x, y, z, w) and color attribute (r, g, b, a) may be represented by thirty-two (32) bits while the texture attributes may be represented in one hundred twenty-eight (128) bits.

By storing pixel coordinates and attributes in the manner illustrated in FIG. 5, this permits more efficient retrieval of pixel data. For example, when an ALU retrieves stored position coordinates (x, y, z, w) for processing, it is able to retrieve all pixel coordinates for a particular thread (e.g., Thread 0) in a single clock cycle since each RAM device has two simultaneous access input and output ports.

Figure 6:
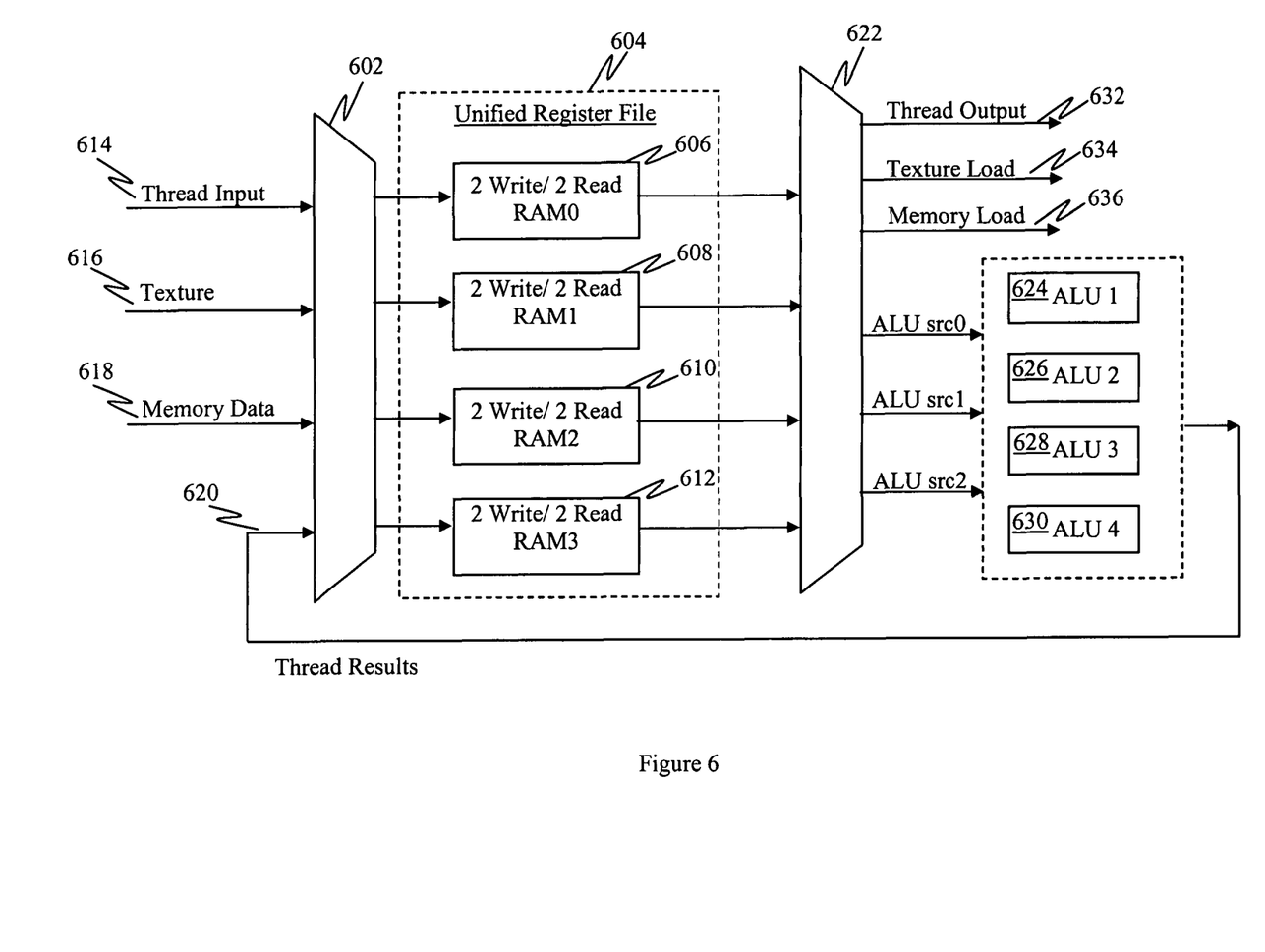
FIG. 6 is a block diagram of a multi-threaded processor that includes four ALUs and a multi-quad unified register file.

FIG. 6 is a block diagram of a multi-threaded processor having a processor core that includes four ALUs 624, 626, 628, 630 and a multi-quad unified register file 604 according to one implementation. An input multiplexer 602 receives thread inputs 614, associated texture data 616, memory data 618, and/or processed thread results 620. An output demultiplexer 622 outputs thread outputs 632, texture load requests 634, and memory load requests 636, as well as thread data to be processed by ALUs 624, 626, 628, and 630. The thread results from ALUs 624, 626, 628, and 630 may be stored back in the register file 604 via the input multiplexer 602.

Unified register file 604 may be divided into four memory banks 606, 608, 610, and 612, each having two input (write) ports and two output (read) ports. Memory banks 606, 608, 610, and 612 may store thread registers containing pixel data (e.g., position coordinates, colors and/or texture attributes) organized as illustrated in FIG. 5. That is, the position coordinates, colors and/or texture attributes for a particular pixel are stored across all four memory banks 606, 608, 610, and 612 so that they can be retrieved in a single clock cycle by ALUs 624, 626, 628, 630.

The data storage arrangement illustrated in FIG. 5 permits data for four pixels of a thread to be retrieved simultaneously in one clock cycle. For example, the ALUs 624, 626, 628, and 630 may be coupled to the unified register file 604 by three busses (i.e., ALU src0, src1, and src2), each 128 bits wide, and configured for scalar-based operations on four pixels. The ALUs 624, 626, 628, and 630 may receive the X, Y, and Z coordinates for four pixels (e.g., P0.X, P1.X, P2.X, P3.X from Bank 0, P0.Y, P1.Y, P2.Y, P3.Y from Bank 1, and P0.Z, P1.Z, P2.Z, P3.Z from Bank 2 in FIG. 5), with each coordinate being 32 bits wide. Once received by the ALUs 624, 626, 628, and 630, each ALU may perform operations on the coordinates for a different pixel.

To process the data for four pixels in one clock cycle, the four ALUs 624, 626, 628, and 630 processes one pixel each. The pixel data can then be sent to the four ALUs 624, 626, 628, and 630 (quad core) which are coupled to unified register file 604 so that four pixels P0, P1, P2, P3 for a particular thread can be processed simultaneously on the same clock cycle with each ALU processing one of the four pixels.

Figure 7:
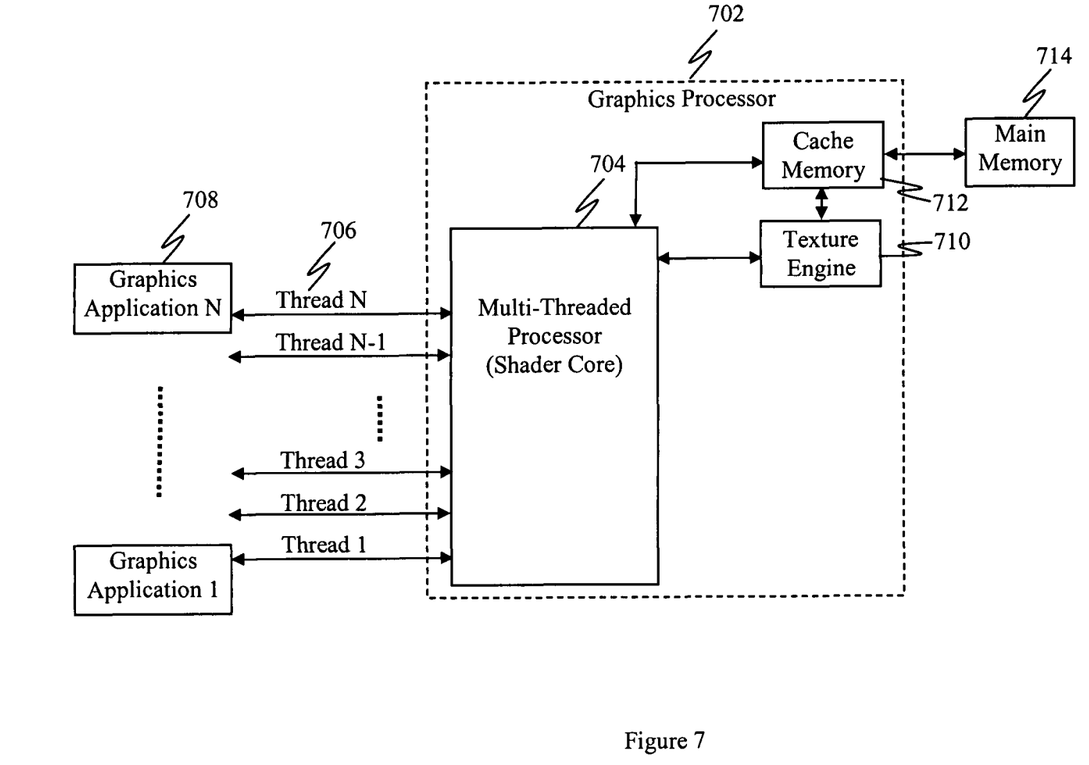
FIG. 7 is a block diagram of a graphics processor that includes a multi-threaded processor.

FIG. 7 is a block diagram of a graphics processor 702 that includes a multi-threaded processor. Graphics processor 702 includes a multi-threaded processor 704, such as a shader core, that receives a plurality of threads 706 from one or more graphic applications 708 as inputs, either serially or in parallel, processes graphic data in the threads 706 (e.g., pixel coordinates, colors, texture, etc.), and provides the thread results 708 as outputs to the graphic applications 708. Graphics applications 708 may include video games, graphic displays, etc., and may run concurrently. Each graphics application 708 may generate threads to achieve their desired results. Each thread may indicate a specific task to be performed on one or more pixels.

In one implementation, graphics processor 702 also includes supporting components, such as a texture engine 710 that performs specific graphic operations such as texture mapping, and a cache memory 712 that is a fast memory that can store data and instructions for multi-threaded processor 704 and texture engine 710. Cache memory 712 may be coupled to an external main memory 714 through which it can receive data or instructions for particular threads.

Multi-threaded processor 704 may include an internal memory device in which a unified memory space is utilized for storing threads 706. The unified memory space is mapped as virtual registers that can be reallocated and resized to store new thread registers and/or support different data types or sizes as illustrated in FIG. 2. Additionally, multi-threaded processor 704 may be configured to store graphic data as illustrated in FIG. 5 to improve fetch and store operations from the memory space.

Graphics processor 702 and/or multi-threaded processor 704 (e.g., shader core) may be implemented in various hardware units, such as application-specific integrated circuits (ASICs), digital signal processors (DSPs), digital signal processing device (DSPDs), programmable logic devices (PLDs), field programmable gate array (FPGAs), processors, controllers, micro-controllers, microprocessors, and other electronic units.

Certain portions of graphics processor 702 or multi-threaded processor 704 may be implemented in firmware and/or software. For example, a thread scheduler and/or load control unit (e.g., in multi-threaded processor 704) may be implemented with firmware and/or software code (e.g., procedures, functions, and so on) that perform the functions described herein. The firmware and/or software codes may be stored in a memory (e.g., cache memory 712 or main memory 714) and executed by multi-threaded processor 704.

Figure 8:
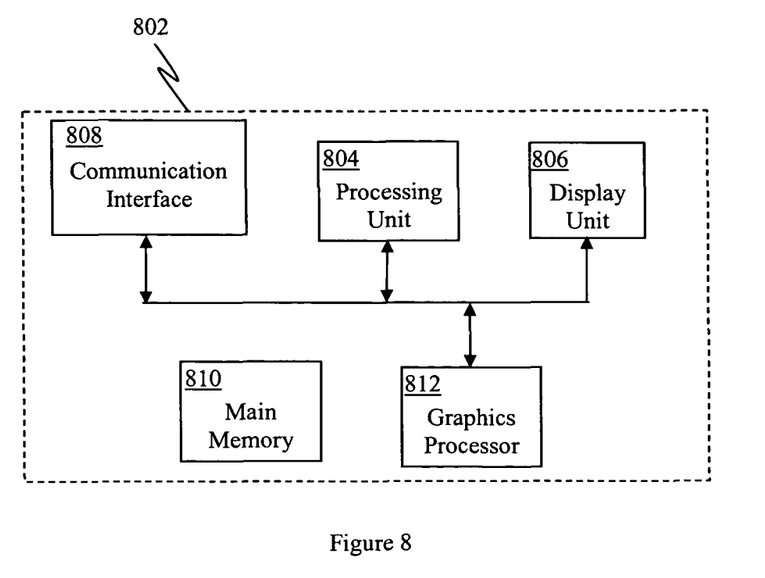
FIG. 8 is a block diagram illustrating a mobile device having a graphics processor with a multi-threaded processor.

FIG. 8 is a block diagram illustrating a mobile device 802 having a graphics processor 812 with a multi-threaded processor. Mobile device 802 may be a mobile telephone, personal digital assistant, mobile video terminal, etc. A processing unit 804 is communicatively coupled to a main memory 810 and a display 806 that provides graphics, video, and other information to a user. A communication interface 808 serves to communicatively couple mobile device 802 to other communication devices via a wireless or wired medium. A graphics processor 812 may be used by processing unit 804 to process graphics data prior to sending it to the display 806. Graphics processor 812 includes a multi-threaded processor configured to operate as illustrated in FIG. 1-7. For instance, graphics processor 812 may have an internal unified memory space (e.g., a unified register file) that is shared by a plurality of threads and is dynamically assigned to threads (e.g., thread registers) as needed. A mapping table is maintained by the multi-threaded processor that maps virtual registers to the unified memory space so that thread registers can be assigned to contiguous or non-contiguous memory addresses. Dynamic sizing of the internal registers allows flexible allocation of the unified memory space depending on the type and size of data in a thread. Yet another feature of the multi-threaded processor provides an efficient method for storing graphics data in the unified memory space to improve fetch and store operations from the unified memory space. In particular, pixel data for four pixels in a thread are stored across four memory banks (in the multi-threaded processor) having independent input/output ports that permit the four pixels to be read in a single clock cycle for processing.

Figure 9:
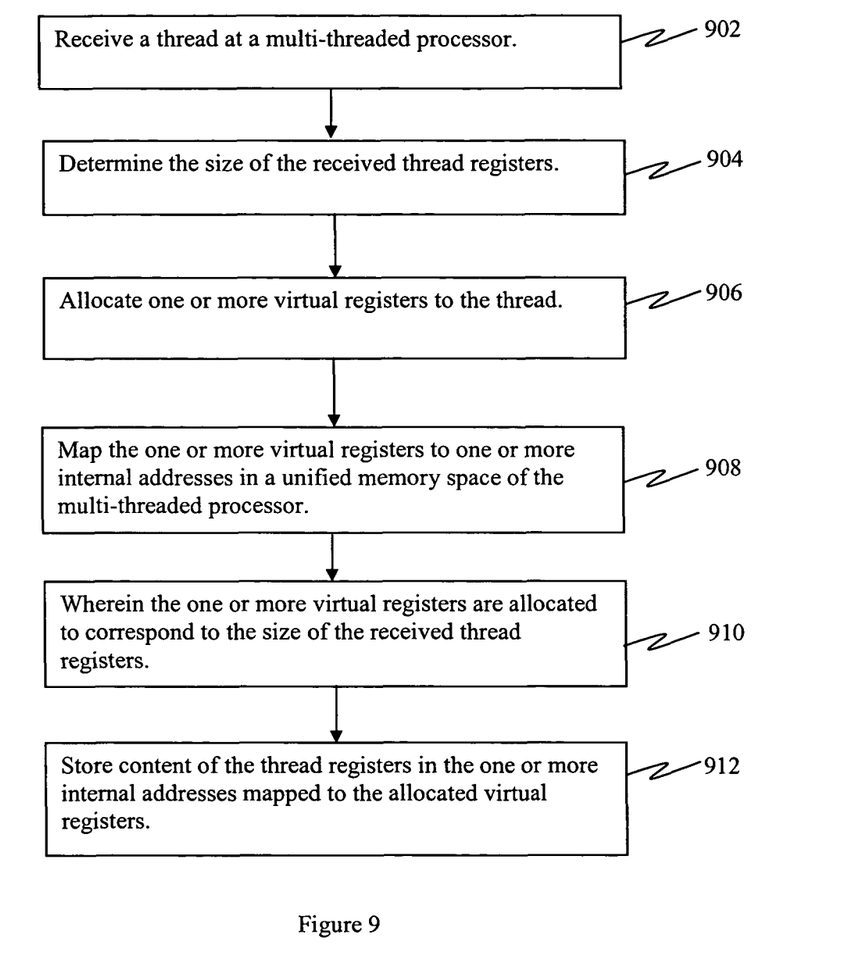
FIG. 9 illustrates a method for storing a thread in a unified register file of a multi-threaded processor.

FIG. 9 illustrates a method for storing a thread in an internal unified register file of a multi-threaded processor. A thread (e.g., including graphics or pixel data and associated instructions, attributes, and/or registers) is received at a multi-threaded processor 902. In some implementations, the size of the received thread registers may also be determined 904. One or more virtual registers are allocated to the thread 906. For example, the allocated virtual registers may have contiguous offsets or addresses. The one or more virtual registers are mapped to one or more internal addresses in a unified memory space (e.g., in internal memory device or unified register file) of the multi-threaded processor 908. The one or more virtual registers may be allocated to correspond to the size of the received thread registers 910. That is, the size of the one or more virtual registers in the unified memory space (e.g., in unified register file) may vary depending on the size of the received thread registers. Content of the thread registers is then stored in the one or more internal addresses mapped to the allocated virtual registers 912.

Figure 10:
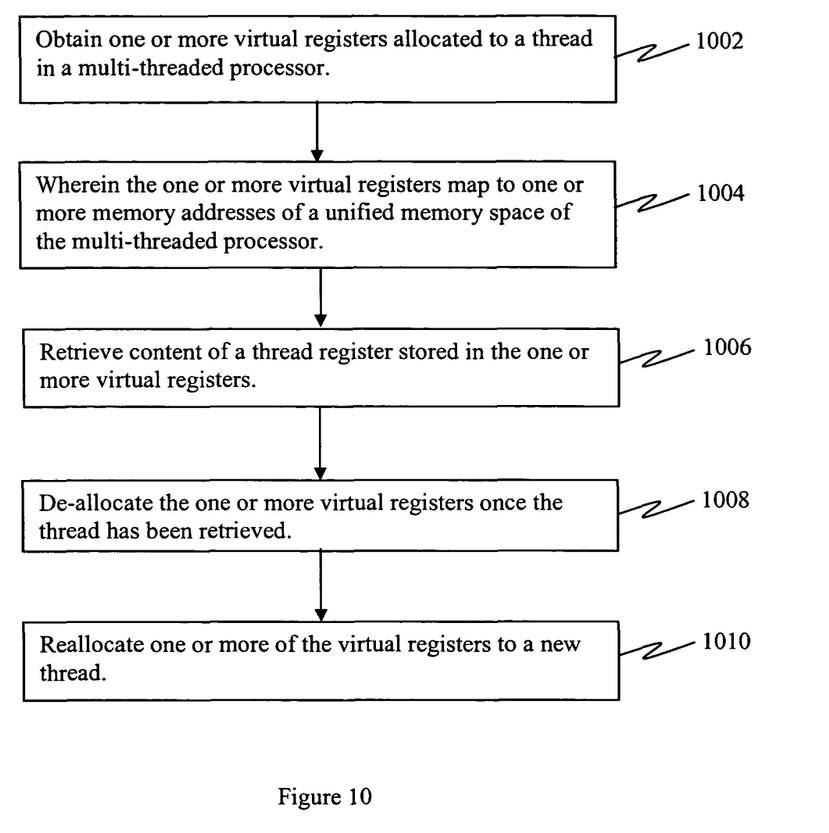
FIG. 10 illustrates a method for retrieving content of a thread register from an internal unified register file of a multi-threaded processor.

FIG. 10 illustrates a method for retrieving content of a thread register from an internal unified register file of a multi-threaded processor. One or more virtual registers allocated to a thread in a multi-threaded processor are obtained 1002. The one or more virtual registers are mapped to one or more memory addresses of a unified memory space (e.g., unified register file) 1004. Content of a thread register stored in the one or more virtual registers is then retrieved 1006. Once a thread is retrieved from the one or more virtual registers, the one or more virtual registers are de-allocate 1008 so that they may be reallocated to a new thread 1010 as needed.

Figure 11:
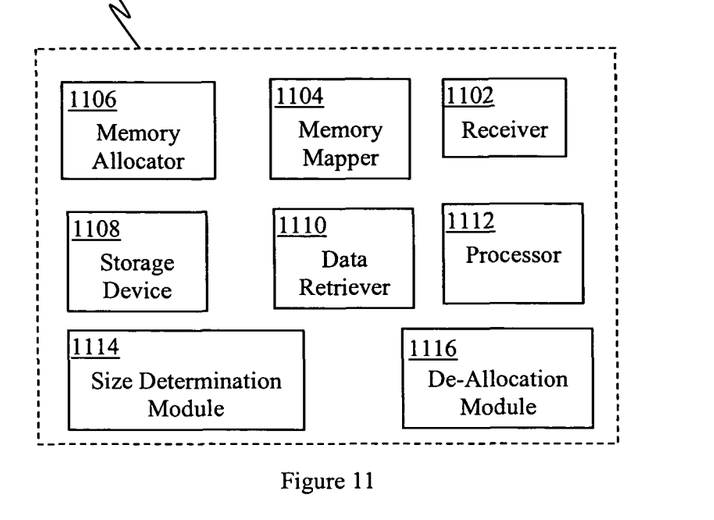
FIG. 11 illustrates another implementation of a multi-threaded processor.

FIG. 11 illustrates a multi-threaded processor 1100 including a receiver 1102 for receiving a thread having associated thread registers, a memory mapper 1104 for mapping one or more virtual registers to one or more internal addresses in a unified memory space, a memory allocator 1106 for allocating one or more virtual registers to the thread registers, and a storage device 1108 for storing content of the thread registers in the one or more internal addresses associated with the allocated virtual registers. The multi-threaded processor may further include a data retriever 1110 for retrieving content for the thread registers from the one or more internal addresses based on the virtual register mapping, a processor 1112 for processing content of the thread registers stored in the one or more internal addresses to obtain a result, the storage device 1108 for storing the result to one or more other virtual registers mapped to one or more other internal addresses in the unified memory space. One implementation provides a size determination module 1114 for determining the size of the received thread registers, the memory mapper 1104 for dynamically mapping to the one or more internal addresses based on the size of the received thread registers, and a de-allocation module 1116 for de-allocating the one or more virtual registers once the processing unit has processed the thread.

Accordingly, a multi-threaded processor is provided comprising: (a) means for receiving a thread having associated thread registers, (b) means for mapping one or more virtual registers to one or more internal addresses in a unified memory space, (c) means for allocating one or more virtual registers to the thread registers, and (d) means for storing content of the thread registers in the one or more internal addresses associated with the allocated virtual registers.

One or more of the components, steps, and/or functions illustrated in FIGS. 1, 2, 3, 4, 5, 6, 7, 8, 9, 10 and/or 11 may be rearranged and/or combined into a single component, step, or function or embodied in several components, steps, or functions without departing from the invention. Additional elements, components, steps, and/or functions may also be added without departing from the invention. The apparatus, devices, and/or components illustrated in FIGS. 1, 2, 3, 5, 6, 7, 8 and/or 11 may be configured to perform one or more of the methods, features, or steps described in FIGS. 9 and/or 10.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A multi-threaded processor comprising:
a thread scheduler configured to receive multiple threads, each of the threads having one or more thread registers, determine a dynamic size of each of the thread registers of each of the multiple threads, create, in a unified register file, a virtual register mapping that defines virtual registers having contiguous addresses and that maps the contiguous virtual registers to internal addresses in a unified register file's unified memory space mapped by the virtual registers, wherein the virtual register mapping maps at least one of the contiguous virtual registers to a non-contiguous internal address in the unified memory space in accordance with the determined size of each of the thread registers, wherein the non-contiguous internal address addresses a portion of the unified memory space, wherein a size of the portion of the unified memory space that is addressed by the non-contiguous internal address is based on the determined size of each of the thread registers of each of the multiple threads, wherein the thread scheduler is further configured to allocate one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads, and store content of each of the thread registers of each of the multiple threads at the internal addresses in the unified memory space in accordance with the virtual register mapping that also indicates which of the one or more allocated virtual registers is allocated to which thread of the multiple threads;
the unified register file coupled to the thread scheduler;
and a processing unit coupled to the unified register file and configured to retrieve content of the thread registers of each of the multiple threads from the internal addresses in the unified memory space in accordance with the virtual register mapping that maps the one or more allocated virtual registers to internal addresses in the unified memory space.

2. The multi-threaded processor of claim 1 wherein the processing unit is further configured to
process the content of the thread registers of the multiple threads to obtain a result, and
store the result to one or more other virtual registers mapped to one or more other internal addresses in the unified memory space.

3. The multi-threaded processor of claim 1 wherein the thread scheduler is configured to de-allocate the one or more virtual registers allocated to one thread of the multiple threads once the processing unit has processed that thread.

4. The multi-threaded processor of claim 1 wherein the mapped internal addresses in the unified memory space corresponding to the virtual registers allocated for the received multiple threads comprise the at least one non-contiguous internal address in the unified memory space.

5. The multi-threaded processor of claim 1 wherein the thread scheduler maintains the virtual register mapping as a mapping table of allocated virtual registers mapped to internal addresses in the unified memory space.

6. The multi-threaded processor of claim 1 wherein at least one thread of the multiple threads includes pixel data for a plurality of pixels.

7. The multi-threaded processor of claim 6 wherein the unified register file is divided into a plurality of memory banks and the pixel data for two or more pixels of the plurality of pixels is stored across two or more of the plurality of memory banks.

8. The multi-threaded processor of claim 7 wherein the memory banks include a plurality of simultaneous read and write ports that permit stored content for the thread registers to be read from the memory banks while content for new thread registers is stored to the same memory banks.

9. The multi-threaded processor of claim 7 wherein the processing unit is configured to retrieve pixel data for the two or more pixels stored across two or more memory banks in a single clock cycle.

10. A multi-threaded processor comprising:
means for receiving multiple threads, each of the threads having one or more thread registers;
means for determining a dynamic size of each of the thread registers of each of the multiple threads;
means for creating, in a unified register file, a virtual register mapping that defines virtual registers having contiguous addresses and that maps the contiguous virtual registers to internal addresses in the unified register file's unified memory space mapped by the virtual registers, wherein the virtual register mapping maps at least one of the contiguous virtual registers to a non-contiguous internal address in the unified memory space in accordance with the determined size of each of the thread registers, wherein the non-contiguous internal address addresses a portion of the unified memory space, and wherein a size of the portion of the unified memory space that is addressed by the non-contiguous internal address is based on the determined size of each of the thread registers of each of the multiple threads; and means for allocating one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads; and means for storing content of each of the thread registers of each of the multiple threads at the internal addresses in the unified memory space in accordance with the virtual register mapping that also indicates which of the one or more allocated virtual registers is allocated to which thread of the multiple threads.

11. The multi-threaded processor of claim 10 further comprising:
means for retrieving content for the thread registers of each of the multiple threads from the unified memory space in accordance with the one or more allocated virtual registers and the virtual register mapping.

12. The multi-threaded processor of claim 10 further comprising:
means for processing content of the thread registers of the multiple threads stored in the unified memory space in accordance with the one or more allocated virtual registers and the virtual register mapping to obtain a result; and
means for storing the result to one or more other virtual registers mapped to one or more other internal addresses in the unified memory space.

13. The multi-threaded processor of claim 10 wherein the unified register file is divided into a plurality of memory banks, and pixel data for a pixel is stored across the plurality of memory banks.

14. The multi-threaded processor of claim 13 wherein the pixel data comprises position, color and texture data that is stored across the plurality of memory banks.

15. A method comprising:
receiving multiple threads at a multi-threaded processor, each of the multiple threads including one or more thread registers;
determining a dynamic size of each of the thread registers of each of the multiple threads;
creating, in the multi-threaded processor's unified register file, a virtual register mapping that defines virtual registers having contiguous addresses and that maps the contiguous virtual registers to internal addresses in the unified register file's unified memory space mapped by the virtual registers, wherein the virtual register mapping maps at least one of the contiguous virtual registers to a non-contiguous internal address in the unified memory space in accordance with the determined size of each of the thread registers, wherein the non-contiguous internal address addresses a portion of the unified memory space, and wherein a size of the portion of the unified memory space that is addressed by the non-contiguous internal address is based on the determined size of each of the thread registers of each of the multiple threads; and
allocating one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads; and storing content of the each of the thread registers of each of the multiple threads at the internal addresses in the unified memory space in accordance with the virtual register mapping that also indicates which of the one or more allocated virtual registers is allocated to which thread of the multiple.

16. The method of claim 15 wherein the one or more virtual registers are allocated to correspond to a size of each of the thread registers of each thread of the multiple threads.

17. The method of claim 15 further comprising
retrieving content for the thread registers of each of the multiple threads stored in the unified memory space in accordance with the one or more allocated virtual registers and the virtual register mapping; and
de-allocating the one or more virtual registers allocated to one thread of the multiple threads once that thread has been processed.

18. The method of claim 15 further comprising:
re-allocating the one or more virtual registers to a new thread.

19. The method of claim 15 wherein at least one thread of the multiple threads includes pixel data for a plurality of pixels.

20. The method of claim 19 wherein the pixel data for a pixel of the plurality of the pixels is stored across two or more memory storage devices.

21. The method of claim 20 further comprising:
retrieving the pixel data stored in the two or more memory storage devices while simultaneously storing data to the two or more memory storage devices.

22. A non-transitory machine-readable medium as a memory storage device tangibly storing one or more instructions for processing multiple threads in a multi-threaded processor, which when executed by the multi-threaded processor causes the multi-threaded processor to:
receive multiple threads, each of the multiple threads including one or more thread registers;
determine a dynamic size of each of the thread registers of each of the multiple threads;
create, in a multi-threaded processor's unified register file, a virtual register mapping that defines virtual registers having contiguous addresses and that maps the contiguous virtual registers to internal addresses in a unified register file's unified memory space mapped by the virtual registers, wherein the virtual register mapping maps at least one of the contiguous virtual registers to a non-contiguous internal address in the unified memory space in accordance with the determined size of each of the thread registers, wherein the non-contiguous internal address addresses a portion of the unified memory space, and wherein a size of the portion of the unified memory space that is addressed by the non-contiguous internal address is based on the determined size of each of the thread registers of each of the multiple threads;
allocate one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads; and
store content of each of the thread registers of each of the multiple threads at the internal address in the unified memory space in accordance with the virtual register mapping that also indicates which of the one or more allocated virtual registers is allocated to which thread of the multiple threads.

23. The machine-readable medium of claim 22 further having one or more instructions which when executed cause the multi-threaded processor to:
retrieve content of the thread registers of each of the multiple threads stored in the unified memory space in accordance with the one or more allocated virtual registers and the virtual register mapping; and
de-allocate the one or more virtual registers allocated to one thread of the multiple threads once that thread has been processed.

24. The machine-readable medium of claim 22 further having one or more instructions which when executed cause the multi-threaded processor to:
re-allocate the one or more virtual registers to a new thread.

25. A graphics processor comprising:
a cache memory for receiving external instructions;
a texture engine for storing graphics texture data;
a multi-threaded processor coupled to the cache memory and texture engine, the multi-threaded processor configured to
receive multiple threads each having one or more thread registers;
determine a dynamic size of each of the thread registers of each thread of the multiple threads;
create, in the multi-threaded processor's unified register file, a virtual register mapping that defines virtual registers having contiguous addresses and that maps the contiguous virtual registers to internal addresses in the unified register file's unified memory space mapped by the virtual registers, wherein the virtual register mapping maps at least one of the contiguous virtual registers to a non-contiguous internal address in the unified memory space in accordance with the determined size of each of the thread registers of each thread of the multiple threads, wherein the non-contiguous internal address addresses a portion of the unified memory space, and wherein a size of the portion of the unified memory space that is addressed by the non-contiguous internal address is based on the determined size of each of the thread registers of each of the multiple threads;
allocate one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads; and
store content of each of the thread registers of each of the multiple threads at the internal addresses in the unified memory space in accordance with the virtual register mapping that also indicates which of the one or more allocated virtual registers is allocated to which thread of the multiple threads.

26. The graphics processor of claim 25 wherein the multi-threaded processor is further configured to
obtain one or more instructions associated with the received multiple threads from the cache memory; and
obtain texture data associated with the received multiple threads from the texture engine.

27. A wireless communication device comprising:
a communication interface to wirelessly communicate with other devices;
a graphics processor coupled to provide graphics data to the display unit, the graphics processor configured to
receive multiple threads each including one or more thread registers;
determining a dynamic size of each of the thread registers of each thread of the multiple threads;
create a unified register file, a virtual register mapping that defines virtual registers having contiguous addresses and that maps the contiguous virtual registers to internal addresses in the unified register file's unified memory space mapped by the virtual registers, wherein the virtual register mapping maps at least one of the contiguous virtual registers to a non-contiguous internal address in the unified memory space in accordance with the determined size of each of the thread registers of each thread of the multiple threads, wherein the non-contiguous internal address addresses a portion of the unified memory space, and wherein a size of the portion of the unified memory space that is addressed by the non-contiguous internal address is based on the determined size of each of the thread registers of each of the multiple threads;
allocate one or more of the contiguous virtual registers to the one or more thread registers of each of the multiple threads, a size of at least one of the allocated virtual registers being different from a size of another of the allocated virtual registers, and the size of the at least one of the allocated virtual registers being based on the determined size of each of the thread registers of each of the multiple threads; and
store content of each of the thread registers of each of the multiple threads at the internal address in the unified memory space in accordance with the virtual mapping that also indicates which of the one or more allocated virtual registers is allocated to which thread of the multiple threads.

\* \* \* \* \*